United States Patent [19]

McRowe

[11] 3,819,577

[45] June 25, 1974

[54] FLAME RETARDANT POLYVINYLCHLORIDE COMPOSITIONS

[75] Inventor: Arthur W. McRowe, Akron, Ohio

[73] Assignee: The B. F. Goodrich Company, New York, N.Y.

[22] Filed: Oct. 19, 1973

[21] Appl. No.: 407,864

[52] U.S. Cl. .......................................... 260/45.75 C
[51] Int. Cl. ............................................ C08f 45/56
[58] Field of Search ............... 260/45.75 C, 92.8 A; 117/138; 424/78, 140

[56] References Cited
UNITED STATES PATENTS 3,723,139   3/1973   Larkin et al. ...................... 260/45.7

*Primary Examiner*—V. P. Hoke
*Attorney, Agent, or Firm*—J. Hughes Powell, Jr.

[57] ABSTRACT

Cuprous cyanide and cuprous thiocyanate are effective in reducing flame spread in vinyl chloride polymers and retard smoke formation when vinyl chloride polymers burn.

5 Claims, No Drawings

FLAME RETARDANT POLYVINYLCHLORIDE COMPOSITIONS

BACKGROUND OF THE INVENTION

While vinyl chloride polymers have good flame resistance, there are conditions under which such materials will burn, particularly when compounded, for example, with many liquid plasticizers. Smoke formation, when vinyl chloride polymers are burning, may be a severe problem. A number of fire and smoke retardant additives for vinyl chloride have been proposed and tried. None has been found to be completely satisfactory. While certain organic copper compounds have been used in vinyl chloride polymers to provide fungicidal resistance, the use of copper compounds in vinyl chloride polymers is normally avoided because many of the copper compounds are colored or form colored reaction products with other ingredients in the vinyl chloride compounds, and are considered to have an adverse effect on the stability and other properties of vinyl chloride polymers.

SUMMARY OF THE INVENTION

Cuprous cyanide and cuprous thiocyanate are effective fire and smoke retardant additives for vinyl chloride polymers.

DETAILED DESCRIPTION

The cuprous cyanide and cuprous thiocyanate are used normally in powder form in amounts greater than about 0.01 weight part per 100 weight parts of vinyl chloride polymer, more preferably from about 0.1 weight part to about 5 to 10 weight parts per 100 weight parts of vinyl chloride polymer. The cuprous cyanide or cuprous thiocyanate are readily mixed with the vinyl chloride polymers as are any other compounding ingredient, as is well known to those skilled in the art.

The vinyl chloride polymers include those vinyl chloride polymers that are homopolymers, that is, polyvinyl chloride, as well as those copolymers containing vinyl chloride and up to about 50 percent, more usually about 30 percent by weight of at least one other vinylidene monomer containing at least one terminal

group such as vinylidene chloride, alkyl acrylates and methacrylates wherein the alkyl group containing 1 to 10 carbon atoms, acrylic acids, amides and nitriles thereof such as acrylic acid, ethacrylic acid, acrylamide, N-methylol methacrylamide, acrylonitrile, methacrylonitrile, and the like, α-olefins containing 2 to 6 carbon atoms such as ethylene and propylene, vinyl esters such as vinyl acetate, vinyl butyrate, vinyl benzoate, vinyl aromatics such as styrene, chlorostyrene, ethyl styrene, vinyl naphthalene, vinyl alkyl ethers, vinyl ketones, chlorinated vinyl chloride polymers; and blends of vinyl chloride polymers with other polymers, both plastics and elastomers, for example with ABS resins, with 10 to 40 percent of copolymers of styrene and acrylonitrile or styrene and methyl methacrylate wherein styrene is the major component, elastomers containing about equal amounts of styrene and acrylonitrile with butadiene, polyurethanes, nitrile elastomers, both liquid and soild, containing from about 15 to 40 percent acrylonitrile with the remainder butadiene, polyolefins and the like. These vinyl chloride polymers normally are high molecular weight polymers having a specific viscosity greater than 0.4 measured as a 0.4 percent solution in nitrobenzene.

The vinyl chloride polymers will be mixed with standard compounding ingredients known to those skilled in the art, plasticizers, lubricants, stabilizers, fillers, colorants, processing aids and the like. While these compounds are most effective in vinyl chloride polymers substantially free of plasticizers subject to burning, they provide improved compositions as to flame propagates and smoke when plasticizers are present.

In the following Examples, there is reported the oxygen index, OI, a $D'_{0.6}$ smoke number, and $D_m$ a maximum optical density observed with a vertical light path in the National Bureau of Smoke Chamber (NBS). The oxygen index is determined in accordance with ASTM D2863 test method and $D'_{0.6}$ smoke number measured when this apparatus is modified by the means described by Dipietro et al. Journal of Flame and Flammability, Volume 2, Page 36, 1971, i.e., the optical density of the smoke generated when the sample is burning at the rate of 0.6 gram one minute. The NBS smoke chamber and its use are described by Gross et al in Fire Test Methods, ASTM 422, 1967, Pages 166–206. All NBS $D_m$ smoke numbers are in the flaming mode.

EXAMPLE I

A simple vinyl chloride polymer compound was prepared by mixing 100 weight parts of polyvinyl chloride Geon 103EP with 2.0 weight parts of dibutyltindithioglycolate and 0.75 weight part of polyethylene, specific gravity 0.924 g/cc and melt index 5 g/10 minutes. The cuprous cyanide or cuprous thiocyanate were dry mixed with this compound and milled at 250°F. for 3 minutes and press molded at 260°F. for 5 minutes and cooled under pressure. The following results were obtained.

| Copper Compound | Parts | OI | $D'_{0.6}$ | NBS $D_m$ |
|---|---|---|---|---|
| CuCN | 0.05 | 51.4 | 295 | |
| | 0.1 | 52.5 | 331 | |
| | 0.5 | 56.3 | 237 | |
| | 1.0 | 57.9 | 167 | |
| | 2.0 | 60.2 | 175 | 212 |
| | 5.0 | 60.5 | 150 | 154 |
| | 10.0 | 63.8 | 164 | 150 |
| CuSCN | 0.05 | 51.8 | 322 | |
| | 0.14 | 55.6 | 369 | |
| | 0.5 | 59.0 | 198 | |
| | 1.38 | 57.4 | 177 | |
| | 2.0 | 57.7 | 175 | 240 |
| | 5.0 | 56.2 | 150 | 203 |
| | 10.0 | 57.6 | 119 | 170 |
| Control | 0 | 44 | 450 | 700 |

The increase in oxygen index indicating improved flame resistance as the concentration of the cuprous compounds is increased from 0 up to 10 is readily evident. Likewise, the unexpected and startling improvement in decreased smoke formation as measured by two different methods is clearly indicated when the control containing no cuprous as compared to even as little as 0.05 weight part of cuprous compound per 100 weight parts of vinyl chloride polymer.

Cuprous cyanide and cuprous thiocyanate are not reactive with polyvinyl chloride at the milling and pressing temperatures used. There is no discoloration of the compounds when barium, cadmium, zinc stabilizers are used and only slightly off-white samples may be noted with tin sulfur stabilizers. In contrast to this, many copper salts such as cupric formate cause problems in milling with polyvinyl chloride causing discoloration and black spots. While copper acetylacetonate does not form black spots, there is reactive discoloration during processing and the compounds continue to discolor on heating. Cuprous oxide gives brick red vinyl chloride compounds and articles and is not as efficient a flame and smoke retardant as cuprous cyanide and cuprous thiocyanate.

I claim:

1. A composition comprising a vinyl chloride polymer and a cuprous compound selected from the class consisting of cuprous cyanide and cuprous thiocyanate said cuprous compound being present in amounts from about 0.01 to about 10 weight parts per 100 weight parts of vinyl chloride.

2. The composition of claim 1 wherein the vinyl chloride polymer is poly(vinyl chloride).

3. The composition of claim 2 wherein the cuprous compound is cuprous cyanide.

4. The composition of claim 2 wherein the cuprous compound is cuprous thiocyanate.

5. The composition of claim 1 wherein the vinyl chloride polymer contains up to 50 percent by weight of at least one vinylidene compound copolymerized therewith having a terminal

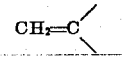

group.

* * * * *